United States Patent [19]

Buchele

[11] Patent Number: 5,276,910
[45] Date of Patent: Jan. 4, 1994

[54] ENERGY RECOVERING HEARING SYSTEM

[75] Inventor: William Buchele, Los Gatos, Calif.

[73] Assignee: Resound Corporation, Redwood City, Calif.

[21] Appl. No.: 759,164

[22] Filed: Sep. 13, 1991

[51] Int. Cl.$^5$ ............................................... H04B 5/00
[52] U.S. Cl. ..................................... 455/41; 455/127; 381/79
[58] Field of Search ...................... 455/41, 42, 91, 106, 455/108, 127; 330/251; 381/79, 68.6

[56] References Cited

U.S. PATENT DOCUMENTS

| | | | |
|---|---|---|---|
| 4,061,972 | 6/1977 | Burgess | 455/42 |
| 4,319,359 | 3/1982 | Wolf | 455/127 |
| 4,592,087 | 5/1986 | Killion | 381/68 |
| 4,631,736 | 12/1986 | Yamanoue et al. | 455/127 |
| 4,689,819 | 8/1987 | Killion | 381/68.6 |

OTHER PUBLICATIONS

"An Output Amplifier Whose Time Has Come", Elmer V. Carlson, *Hearing Instruments*, vol. 39, No. 10, 1988.
"Dispenser Sound Quality Perceptions of Class D Integrated Receivers", Sergei Kochkin, Ph.D. and William J. Ballad, *Hearing Instruments*, vol. 42, No. 4, 1991.
"Applications Note for the Knowles EP Integrated Receiver", A. Ditthardt, *Knowles Electronic, Inc.*, Itasca, Ill., Jan. 3, 1990.

Primary Examiner—Reinhard J. Eisenzopf
Assistant Examiner—Chi Pham
Attorney, Agent, or Firm—McCubbrey, Bartels, Meyer & Ward

[57] ABSTRACT

The present invention comprises a hearing system apparatus and method for electromagnetically communicating signals to a magnetic transducer. The apparatus includes a signalling circuit for producing a pulse-width modulated current signal. An antenna means is coupled to the signalling circuit for producing a variable electromagnetic field whose energy intensity is modulated by the output of the signalling circuit. In addition, an energy storage circuit is coupled to the antenna for storing a substantial portion of the energy stored in the magnetic field produced by the antenna when the magnetic field collapses between cycles of the current signal. Also, an energy recycling circuit is coupled to the storage circuit and the antenna for recovering the energy stored in the storage circuit for use in the next electromagnetic field cycle.

8 Claims, 6 Drawing Sheets

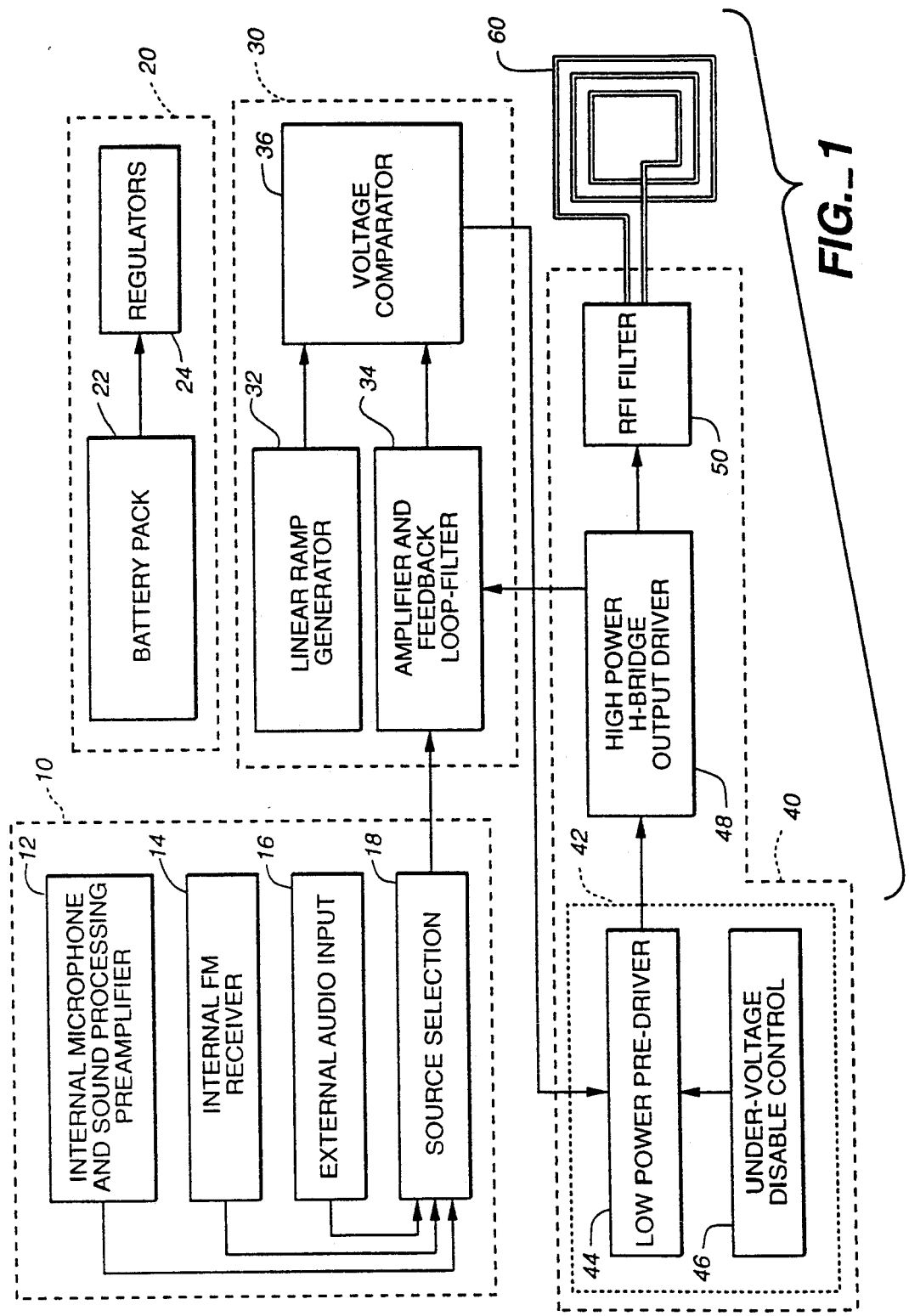
FIG._1

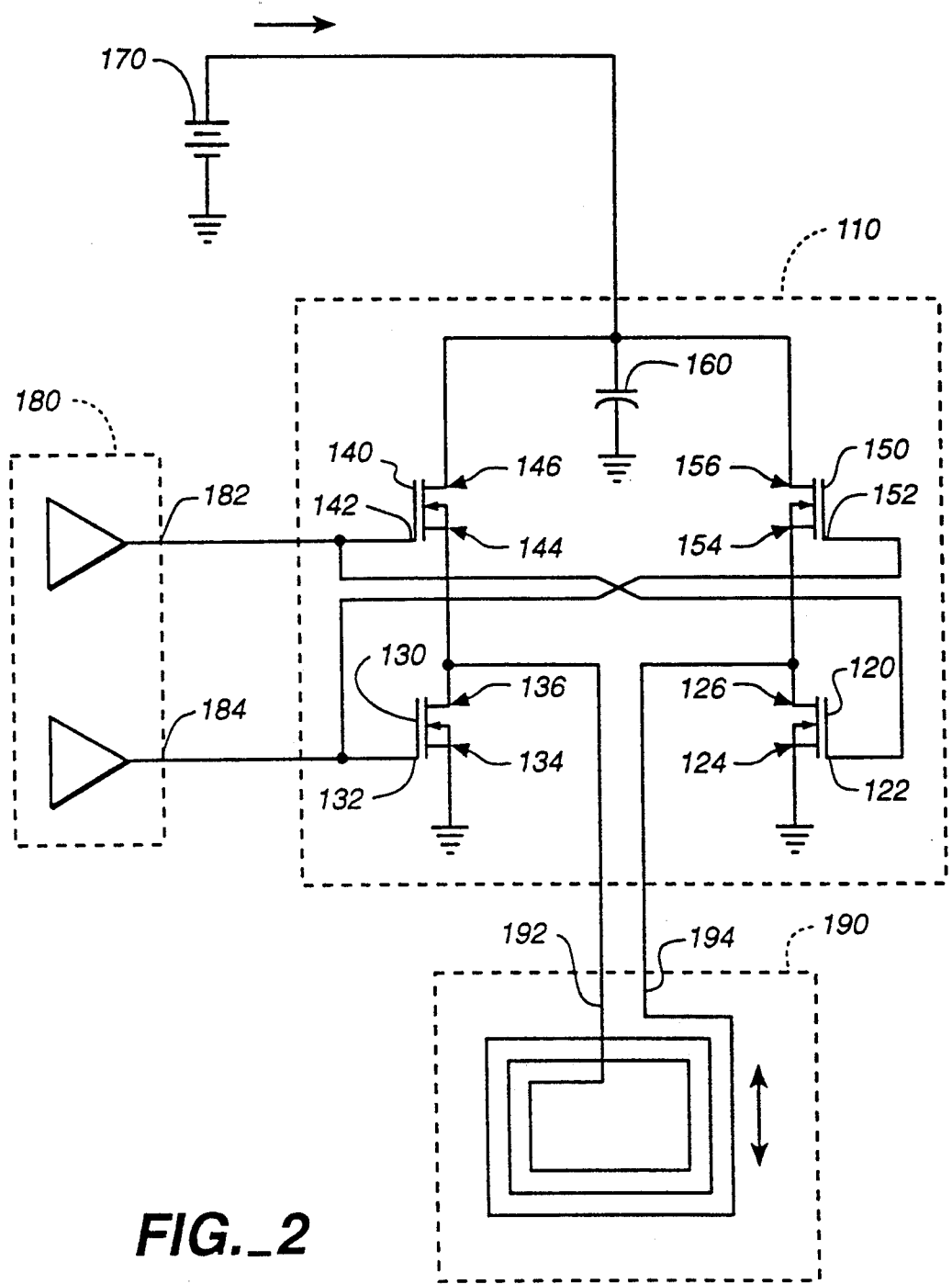
FIG._2

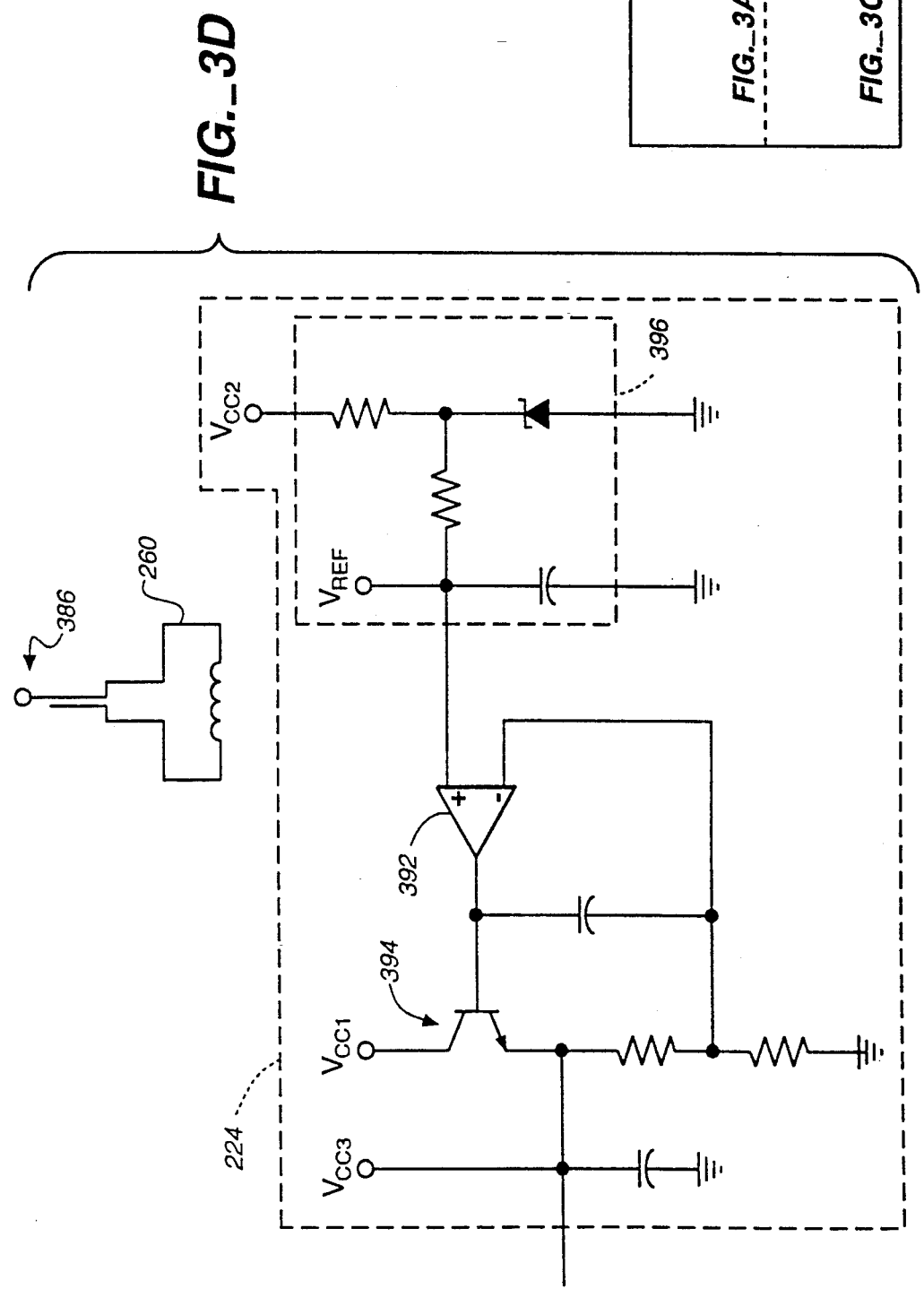

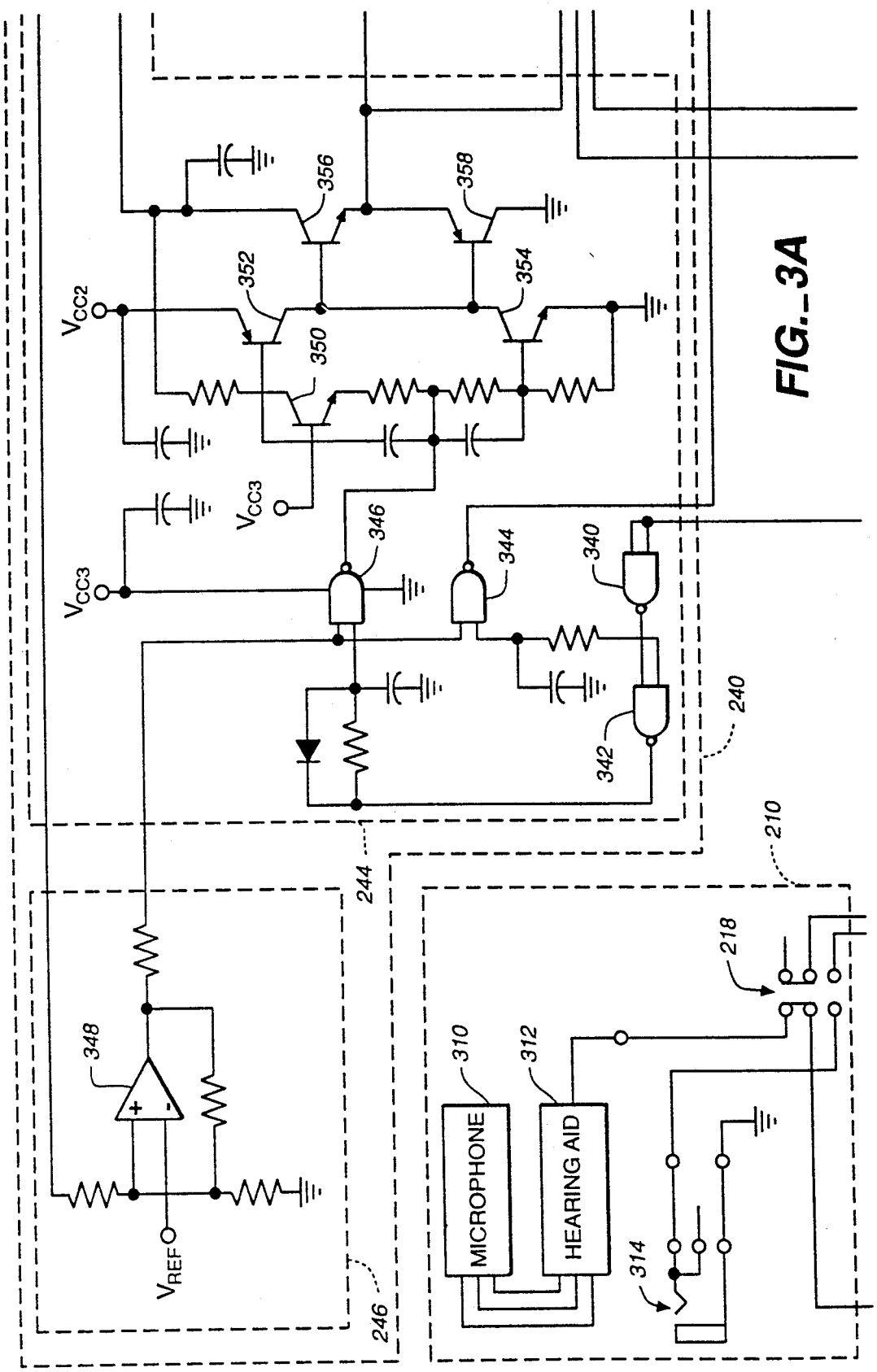
FIG._3A

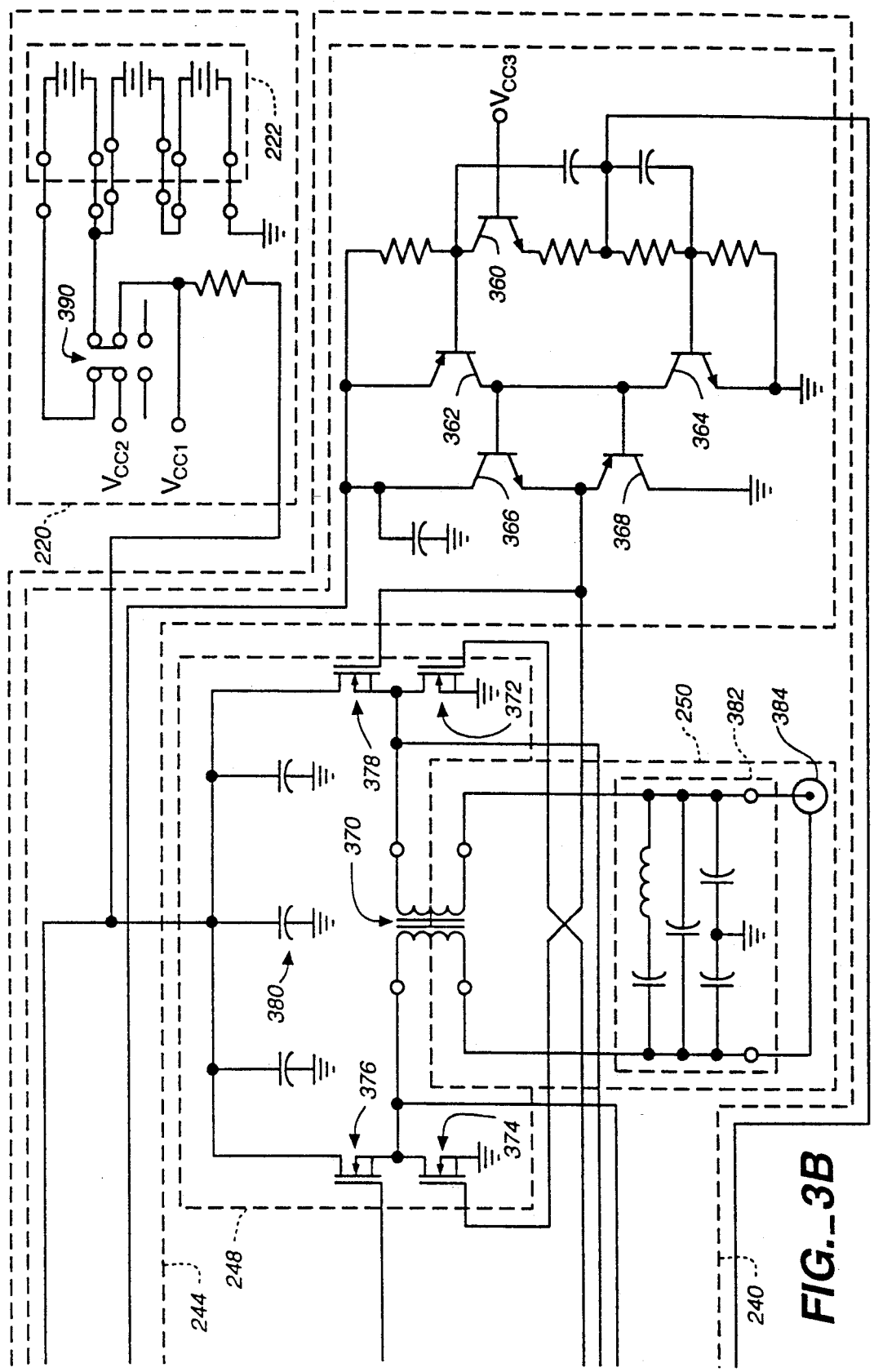
FIG._3B

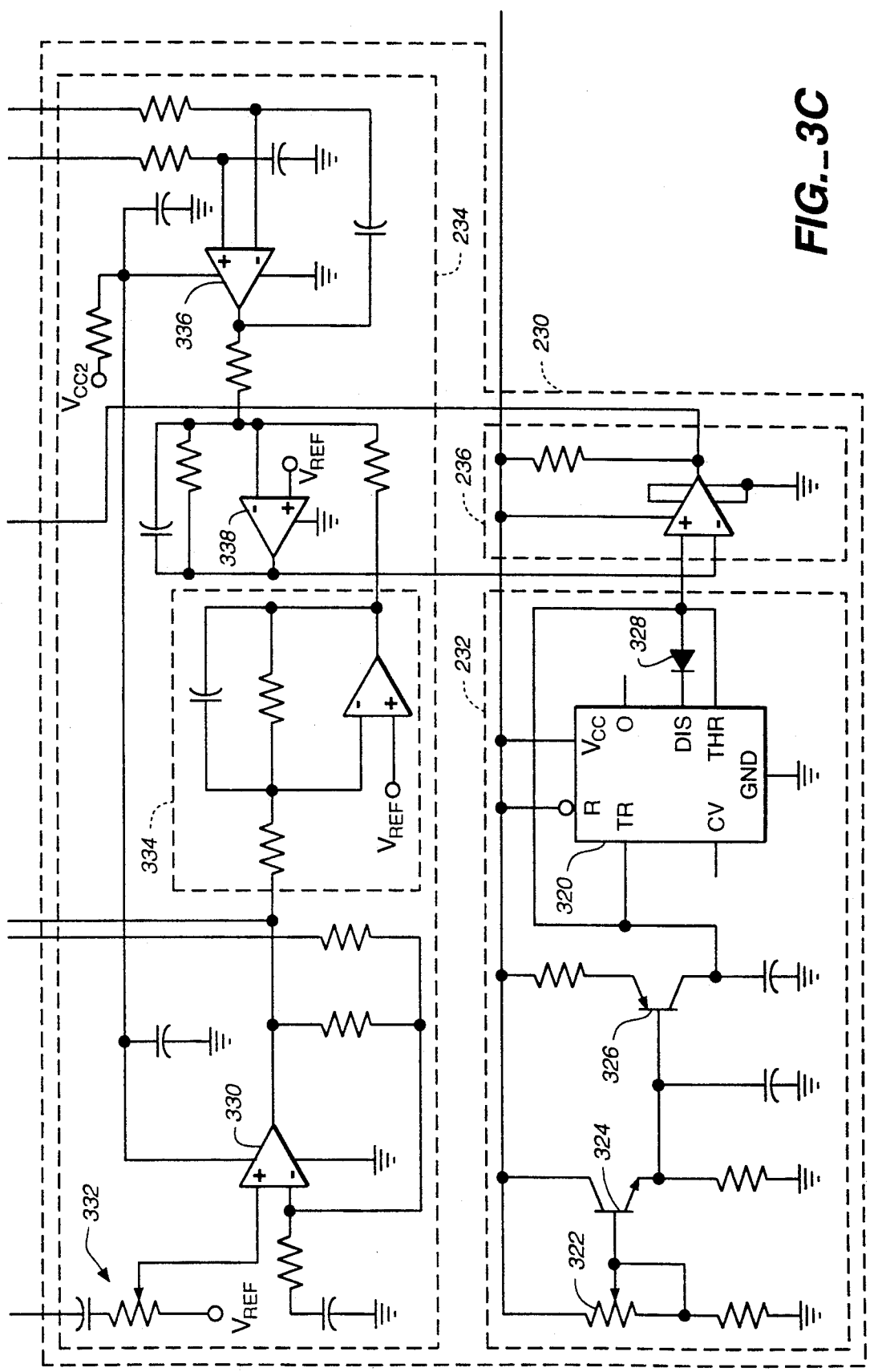
FIG._3C

ENERGY RECOVERING HEARING SYSTEM

FIELD OF THE INVENTION

The present invention relates generally to hearing systems and, more particularly, to improved hearing systems that rely on electromagnetic fields which impart vibrations to an element of the human ear, such as the tympanic membrane of the middle ear structure. Such systems may be used to enhance the hearing of persons with normal or impaired hearing.

BACKGROUND OF THE INVENTION

Hearing systems which rely on amplified acoustic drive output are well known in the prior art. For example, public address (PA) systems used in auditoriums or concert halls provide sounds to an audience with normal hearing by widespread production of amplified acoustic information in the form of sound waves. Such systems, however, are incapable of selectively imparting audio information to some nearby individuals but not to others. If amplification of such systems is increased so as to enable hearing impaired individuals to receive the information, the volume may be too loud for persons with normal hearing.

Another type of acoustic drive sound system is exemplified by the commonly available acoustic hearing aid. Such devices rely on acoustic output provided by a miniature speaker typically located within the wearer's external ear or ear canal, and positioned adjacent to the ear drum. In many cases, a portion of the acoustic output feeds back to the input of the device, causing a self-sustained oscillation. This "feedback" phenomenon, which is generally proportional to the magnitude of the gain, imposes limitations on the amount of gain available to the wearer. As a result, many hearing impaired individuals cannot benefit from such devices. This is especially true for severely hearing impaired individuals, where high acoustic gain requirements result in unacceptable levels of acoustic feedback.

Some prior art hearing systems have utilized electromagnetic energy to vibrate the middle ear structures or the tympanic membrane. An example of this may be found in U.S. Pat. No. 4,957,478 to Maniglia. The Maniglia system uses a hearing device consisting of a microphone, an amplifier, a power source, and an electromagnetic coil placed in the external auditory canal for receiving sound waves and converting them into magnetic fields. A permanent magnet is surgically implanted onto a portion of the bones of the ossicular chain of the individual. The magnet responds to the applied magnetic field, and causes the bones of the ossicular chain to vibrate with the same frequency and amplitude variation as the incoming signal at the microphone. In an alternate embodiment, a sound signal is externally modulated with a radio frequency (RF) signal. The signal is then transmitted through an external coil worn behind the ear to a coil implanted in the mastoid cavity. The mastoid cavity coil decodes the signal to retrieve the original signal, which is then applied to a third coil which vibrates the implanted magnet, resulting in the perception of sound. In the above cases, as well as others not mentioned here, a considerable amount of conspicuous hardware is required for the system to operate. Additional disadvantages include surgical intervention and the various associated risks.

Another type of system proposed by the prior art (Rutschmann, 1959; Goode, 1973) utilizes a small magnet glued or otherwise attached to the tympanic membrane. A coil placed inside or just outside the external auditory canal is driven by currents to produce electromagnetic fields which vibrate the magnet attached to the tympanic membrane. In the case of the Rutschmann system, the current requirement was impractically high for hearing thresholds. The Goode system, on the other hand, provided some improvements in terms of power consumption, but the requirements were still impractically high. Power consumption and other limitations related to coil and magnet design made it necessary, in those systems, to place the coils in close proximity to the magnet.

An improved electromagnetic drive hearing system is shown and described in U.S. patent application Ser. No. 679,661, filed Apr. 1, 1991 and assigned to the assignee of the present invention. These systems permit the use of an inconspicuous in ear magnet transducer driver by a coil which may be positioned inside or outside the ear canal of an individual.

If a system such as those shown and described in the aforementioned patent applications is to be powered by a battery, it is important to minimize the drain on the battery. In this way, lightweight batteries may be used without having to be replaced at inconveniently frequent intervals. Systems for driving electromagnetic type hearing systems and which are currently known in the prior art do not lend themselves to accomplishing this goal. Such prior art systems, which require relatively large currents, have not utilized circuitry with power requirements suitable for the use of relatively lightweight batteries.

Hence it would be desirable for a system to be able to vary a magnetic field in response to ambient sounds in such a way that the energy required to maintain and modulate the electromagnetic field would be provided by lightweight batteries with long usage lives. Such a system should produce an electromagnetic field large enough to communicate with a remote magnetic transducer while utilizing low power.

Broadly, it is an object of the present invention to provide an improved hearing system.

It is a further object of the present invention to provide a hearing system which can communicate with a magnetic transducer by means of a modulated electromagnetic field for long periods while using small current sources.

It is a further object of the present invention to provide a hearing system as described which utilizes low power and communicates by inconspicuous means with a magnetic transducer.

These and other objects of the present invention will be apparent to those skilled in the art from the following detailed description of the invention and the accompanying drawings.

SUMMARY OF THE INVENTION

The present invention comprises a hearing system apparatus for electromagnetically communicating signals to a magnetic transducer. The apparatus includes signalling means for producing a pulse-width modulated current signal. Antenna means are coupled to the signalling means for producing an variable electromagnetic field whose energy intensity is proportional to the output of the signalling means. In addition, energy storage means are coupled to the antenna means for storing a substantial portion of the energy stored in the magnetic field produced by the antenna means when the magnetic field collapses between cycles of the current signal. Also, energy recycling means are coupled to the storage means and the antenna means for recovering the energy stored in the storage means for use in the next electromagnetic field cycle. The apparatus may also include current source means for providing current sufficient to replace that energy which is stored in the electromagnetic field of the antenna means and which is not recovered and stored in the storage means.

More specifically, the said storage means may comprise a capacitor and an inductor. In addition, the energy recycling means may comprise an H-Bridge driver electrically coupled to both the capacitor and the inductor, with the inputs of the H-Bridge driver being electrically coupled to the signalling means and the outputs of said H-Bridge driver being electrically coupled to the antenna means.

The present invention also comprises a method for operating an electromagnetic hearing system wherein a loop antenna is used to drive a magnetic transducer. This method comprises the steps of first driving the loop antenna with pulse-width modulated current signals. Next a substantial portion of the energy stored in the magnetic field produced by the loop antenna when the magnetic field collapses between cycles is recovered. Then the energy so recovered is stored in a storage means for storing electromagnetic energy. Finally the energy stored in the storage means is recovered for use in producing the next current cycle. This method may include the step of providing energy from an electrical current source to replace that energy not recovered from the magnetic field when the magnetic field collapses between cycles.

The present invention further comprises a hearing system. The system includes an acoustic transducer means for converting acoustic energy into an input electrical signal. It further includes the apparatus described above, wherein the pulse-width modulated current signal is representative of the input electrical signal. The system also includes current source means coupled to the antenna means for providing current sufficient to replace that energy which is stored in the electromagnetic field of the antenna means and which is not recovered and stored in the storage means. The system also includes magnetic transducer means for responding to changes in the magnetic field produced by the antenna means by producing vibrations corresponding to the input electrical signal.

In the system of the present invention the acoustic transducer means may comprise a microphone. In addition, the storage means may comprise a capacitor and an inductor. Then the energy recovery means may comprise an H-Bridge driver electrically coupled to both the capacitor and the inductor, where the inputs of said H-Bridge driver are electrically coupled to the signalling means and the outputs of said H-Bridge driver are electrically coupled to the antenna means.

BRIEF DESCRIPTION OF THE DRAWINGS

FIG. 1 is a block diagram of the preferred embodiment of the system of the present invention.

FIG. 2 is a block diagram of the preferred embodiment of the antenna driver of the present invention.

FIGS. 3 and 3A-3D are schematic diagrams of a preferred embodiment of the system of the present invention.

DETAILED DESCRIPTION OF THE INVENTION

The present invention may be best understood in light of the preferred embodiment of the system of the present invention, which is illustrated in block diagram form in FIG. 1. First, audio input circuitry 10 is provided to select an input audio signal to be transmitted to the remote transducer. Any of a number of possible audio signal sources may be used, for example, an internal microphone and sound processing preamplifier 12 may be utilized. Such a source can perform a number of signal processing and filtering processes upon the input sound, as is commonly known to the hearing aid art. In addition, an internal FM receiver 14 or external audio input 16 may be used. It should be understood that these are merely examples of possible audio sources; any compatible audio source may be used. A source selection 18 is provided to select the source to be active at any particular point in time.

Next, the audio signal is converted to a pulse-width modulated circuit by pulse-width modulation circuitry 30. This circuitry comprises a linear ramp generator 32, which produces a sawtooth signal output. Modulation circuitry 30 also includes an amplifier and feedback loop-filter 34. Amplifier and feedback-loop filter 34 takes the output signal from source selection 18 and amplifies it, combining it with a feedback signal, which is described below. Finally, modulation circuitry 30 includes a voltage comparator 36, which compares the output sawtooth signal from ramp generator 32 with the amplified signal output from amplifier and feed-back loop-filter 34 and generates an output pulse-width modulated (PWM) signal. The process by which the PWM signal is generated is well known to the art.

The PWM signal is then applied to an antenna driver circuit 40. Antenna driver circuit 40 comprises three stages: an output driver circuit 42, a high-power H-bridge output driver 48, and an RFI filter 50. Each of these stages is discussed in detail below. The output of RFI filter 50 is then output to a magnetic loop antenna 60.

First, the PWM signal is input to a low power predriver 44. This circuitry is designed to provide relatively large transient gate currents in order to rapidly switch the output transistors (described below) of the high power H-Bridge output driver 48 and yet only use microamp-magnitude standing DC bias current. This is explained in further detail below.

Pre-driver 44 is utilized to provide timing delays to prevent simultaneous switching-on of the two pairs of transistors of H-Bridge output driver 48. Such simultaneous activation would cause large transient commutation currents to flow, which would lead to unnecessary power consumption.

In addition to pre-driver 44, output driver circuit 42 includes an under-voltage disable control 46. Disable control 46 responds to situations in which the system is resetting and drawing too much power by disabling output to H-bridge output driver 48 until the remaining circuitry is properly powered.

Next, the PWM signal is input to high power H-bridge output driver 48. The functioning of H-bridge output driver 48 is described in detail below. Basically H-bridge output driver 48 has two functions. First, it acts to integrate the PWM signal into a high current FM signal. Second, it acts to store energy from the magnetic field produced by the magnetic loop antenna 60 when that magnetic field collapses between cycles of the PWM signal. H-bridge output driver 48 also acts to recover the energy thus stored for use in the next electromagnetic field cycle.

The output of H-bridge output driver 48 is directed as both a feedback signal and an output signal. The feedback signal is directed to one input of the amplifier and feedback loop-filter 34. The output signal is input to RFI filter 50. RFI filter 50 suppresses RF noise, which is necessary for the system to comply with FCC regulations.

Finally, magnetic loop antenna 60 creates a magnetic field, acting as an electromagnet. The magnetic field produced by antenna 60 is proportional to the signal output from RFI filter 50, which is in the form of an FM signal. The energy stored in that field is temporarily stored in H-bridge output driver 48 when the magnetic field collapses between cycles.

The magnetic field is thus used to transmit to a receiving magnetic transducer (not shown). This transducer may be placed in an in-ear hearing device to allow inconspicuous reception of the transmitted signal. Note that the transducer can be easily chosen to present a small load for the antenna driver circuitry 40; the transducer may only couple to a portion of the total field which is several orders of magnitude less than the total field itself. Hence little power is be lost from the magnetic field due to driving the transducer.

In addition the above circuitry, the system includes DC power supply circuitry 20 including a battery pack 22 and regulators 24. Regulation by regulators 24 prevents ordinary fluctuations in battery output from causing aberrations in the performance of the PWM circuitry, leading to transmission of signals which do not accurately represent the audio signal to be transmitted.

Note that by recycling the energy stored in the magnetic field, and by using low-power circuitry as described below, high intensity magnetic fields may be generated from low intensity signals. Measurements indicate that a current loss can be maintained to well under 5%, thus requiring low power drain upon the DC power supply circuitry 20 to maintain the magnetic field from antenna 60.

Next the PWM signal is input to the high power H-bridge output driver 48. The functioning of the H-bridge output driver 48 has three functions. First it efficiently amplifies the low power PWM signal from the low power pre-driver 44 into a high power PWM signal. Second, it integrates the PWM signal into a high-current audio signal which is an accurate but larger representation of the audio input signal from the audio input circuitry 10. Third, the H-bridge output driver 48 also acts to recover the magnetic field energy stored in magnetic loop antenna 60 when said field collapses between cycles of the applied high-current audio signal. Thus, stored, the energy is available for use in generating the next build-up of magnetic field associated with loop antenna 60.

The manner in which the present invention stores and recycles energy from the magnetic field of the antenna 60 can be best understood in light of FIG. 2. It should be noted that the example of the output driver circuitry illustrated in FIG. 2 does not illustrate the RFI circuitry (filter 50 in FIG. 1), for sake of simplicity of presentation. The driver circuitry 180 (pre-driver 44 in FIG. 1), which has two PWM signal connections 182 and 184 connected to the H-bridge output driver 110 (driver 48 in FIG. 1). Each of first and second PWM signal connections 182 and 184 are connected to the gates of two of the four transistors 120, 130, 140 and 150, forming the first transistor pair of transistors 120 and 140 and the second transistor pair of transistors 130 and 150. Therefore first PWM signal connection 182 is connected to gate 122 and gate 142 and second PWM signal connection 184 is connected to gate 132 and gate 152. Currents placed on the gates of the transistors control flow of current between the drains and sources of the transistors, as is well known in the electronic arts.

It is critical that signals on first and second PWM signal connections 182 and 184 are timed such that the first and second transistor pairs are not activated simultaneously, as this would allow commutation currents to flow, as discussed above. Hence it may be assumed that at most one pair of transistors is active at any moment. An inactive transistor acts effectively as an open circuit in this case. Ideally, transistors 120, 130, 140 and 150 have low closed-circuit resistances and high open-circuit resistances.

The operation of the circuit illustrated in FIG. 2 can be understood by first examining the effects of activating the first transistor pair and then the second transistor pair. When a signal is input on first PWM signal connection 182, the first transistor pair is activated. Current then flows from battery 170 through transistor 140 into antenna connection 192, through antenna 190, then into transistor 120 and finally to ground at 124. Hence the current flowing in antenna 190 flows in a counterclockwise (ccw) direction. No current flows through transistors 130 and 150, as second PWM signal connection 184 must be inactive, as discussed above.

Next, the signal is removed from first PWM signal connection 182. The magnetic field in antenna 190 collapses. Removal of first PWM signal connection 182 corresponds to activation of second PWM signal connection 184. When this signal is input, the second transistor pair is activated and the first transistor pair becomes inactive, as discussed above. Thus current begins to flows in the opposite direction. The collapsing field induces a current which charges capacitor 160, which is discharged as the field is reestablished with opposite polarity after the current begins to flow in the opposite, or clockwise (cw) direction. This process is repeated in reverse as the signal switches back to first PWM signal connection 182.

Next the signal is removed from the first PWM signal connection 182. Removal of the first PWM signal connection 182 corresponds to activation of the second PWM signal connection 184. When this signal is input, the second transistor pair is activated and the first transistor pair becomes inactive as discussed above. Thus the battery potential placed across the antenna is periodically reversed by the action of the transistor pairs. The antenna responds electrically as an inductance to the applied voltage. Thus the current ramps-up in the inductance first in the positive sense in response to a positive potential then ramps-down when the potential is reversed as is typical in PWM circuitry. The average current in the antenna remains zero if the timing of the PWM signal is such the period of applied positive potential exactly equals the period of the reversed potential. As the duty-cycle of the PWM signal is modified by the applied audio signal, the amplitude of the average antenna current begins to proportionally track the amplitude of the audio signal as is well known to those skilled in the art of PWM design.

Now, as the field collapses around the antenna inductance, an electromotive force (EMF) or voltage is induced into the antenna in such a sense as to oppose the applied voltage. The applied voltage is the average value of the PWM signal. Thus, during the time the field is collapsing, current is forced into the H-bridge circuit in such a way as to charge storage capacitor C1 without the necessity of drawing current from battery 170. In practice, battery 170 supplies enough current to overcome losses in the H-bridge and antenna while the antenna inductance supplied the vast majority of the charging current.

To minimize losses and maximize the circulating antenna current and thus the intensity of the magnetic field, the output transistor and antenna must be designed to have very low resistance. A very low effective series resistance (ESR) large value capacitor C1 must also be connected to the drains of the output transistors as the internal energy storage device.

This process is analogous to ordinary resonance in an LC circuit. However, proper choice of components allows operation over a wide frequency range, and not simply a single narrow-band resonance frequency range. This is possible because the switching action of the transistors dominates the LC resonance effects. As a result there is no appreciable narrow-band resonance effects for the audio frequency range utilized by the present invention.

Those skilled in the art will recognize that the H-Bridge driver circuit discussed above is one implementation of a Class-D amplifier. Class-D amplifiers are known to the art for their high efficiency and low losses. However, the use of such an amplifier in the present invention differs from ordinary usage, as the intent of use of the amplifier is not to drive a large load. Instead, the present invention seeks to minimize the load by providing low resistance elements. This allows operation of the system with minimal drain on the batteries, as only small amounts of current are required to be added to maintain the magnetic field's strength.

One preferred embodiment of the present invention is presented in schematic diagram form in FIG. 3. While this represents one particular embodiment, numerous alternative implementations of many of the subcircuits of this embodiment will be obvious to those skilled in the art and are encompassed by the present invention.

Audio input circuitry 210 includes two alternative audio sources. First, a microphone 310 and hearing aid processing amplifier 312 are connected to one set of inputs of double-throw switch 218. Second, a phone jack 314 is connected to the second set of inputs to switch 218. Thus switch 218 provides selection between these two audio sources.

Pulse-width modulation circuitry 230 comprises three subcircuits: linear ramp generator 232, amplifier and feedback loop-filter 234, and voltage comparator 236. Pulse-width modulation is well known to the art, and a variety of alternative implementations of modulation circuitry 230 will be apparent to those skilled in the art which are compatible with the present invention.

Linear ramp generator 232, as shown, generates an approximately 100 kHz linear ramp, or sawtooth, output. Linear ramp generator 232 includes ramp generator 320 and the associated circuitry, transistors 324 and 326, variable resistor 322, diode 328, and their associated resistors and capacitors. Its exact frequency is matched by varying the values of the various resistors and capacitors to that of RFI filter 250, which is discussed below.

This matching may be adjusted by means of a variable resistor 322, which together with transistor 324 comprises a clock frequency adjustment subcircuit. The functioning of linear ramp generator 232 will be obvious to those skilled in the art.

Amplifier and feedback loop-filter 234 comprises two major subsections, which provide separate amplification and feed-back functions. Signals from switch 218 are first amplified by means of operational amplifier 330. The noninverting input voltage may be adjusted relative to a reference voltage by means of variable resistor 332. The output of operational amplifier 330 is then input into the inverting input of active filter 334. Active filter 334 comprises an operational amplifier coupled with a resistor-capacitor network between its inverting input and its output, and acts to set the high and low cut-off frequencies for the output signal.

The feedback function of amplifier and feedback loop-filter 234 comprises primarily a loop-filter 336. Loop-filter 336 is itself an operational amplifier which is connected to the output of power transistors 352, 354, 356 and 358, which are discussed below. Loop-filter 336 provides indirect feed-back, as it is an integrator which samples the PWM waveform output from the power transistors and integrates it into an audio signal, rather than sampling the current or actual magnetic field produced by loop antenna 260, which is discussed below.

This indirect feed-back was utilized for simplicity of circuitry. Loop-filter 336 compensates for the roll-off characteristics of the inductance of loop antenna 260, and contributes to the flat frequency response of the system. It also helps to compensate for distortion in the PWM modulation circuitry 230 and for variations in the voltage of batteries 222. However, other means of implementing feed-back, including current sensing or magnetic field sensing, will be obvious to those skilled in the art.

The outputs of the amplification function, i.e. the output of active filter 334, and the feed-back signal output from loop-filter 336, are combined in combination filter 338. Combination filter 338 comprises an operational amplifier with a resistor-capacitor network coupled between its inverting input and its output, as with active filter 334. Such filtering is well known to the art.

The outputs of linear ramp generator 232 and amplifier and feedback loop-filter 234 are input into a voltage comparator 236. More specifically, the outputs of ramp generator 320 and combination filter 338 are each input into voltage comparator 236. Voltage comparator 236 is an operational amplifier configured as a voltage comparator as shown in FIG. 3.

The antenna driver circuit 240 comprises three stages: output driver circuit 242, high-power H-bridge output driver 248, and RFI filter 250. Output driver circuit 242 comprises the low power pre-driver circuit 244 and the under-voltage disable control circuit 246. These are explained in detail above.

Pre-driver circuit 244 comprises two stages. The first stage consists primarily of NAND gates 340, 342, 344 and 346. These are arranged primarily to introduce the timing delays discussed in more detail above. The second stage comprises the transistors 350–368 arranged as multi-stage amplifiers, which allows relatively large transient gate currents to power transistors 372–8 while using minimal DC bias current. The function of these transistors is standard and will be obvious to those skilled in the art from FIG. 3.

NAND gate 340 and 342 each have both inputs tied together, and thus act merely as inverters. NAND gates 344 and 346 each have one input each connected to the output of disable control circuit 246. Hence when disable control circuit 246 deactivates the power, NAND gates 344 and 346 lock high, setting the output of pre-driver circuit 244 to a constant value. Otherwise, the output of pre-driver circuit 244 is identical to its input, except with a time lag introduced by the NAND gates.

Under-voltage disable control circuit 246 comprises primarily an operational amplifier configured as a voltage comparator 348, which produces a fixed low output to pre-driver circuit 244 when the drain on the power supply 220 (discussed below) becomes too great.

H-bridge output driver 248 corresponds to the circuit illustrated in FIG. 2. The primary difference in its function is that it is coupled directly to RFI filter 250. FCC regulations would prohibit directly tieing H-bridge output driver 248 to loop antenna 250. Hence transformer 370, which is an inductor, acts as the loop antenna of FIG. 2. This is not material to the recovery of energy from the magnetic field of loop antenna 260, as transformer 370 and the rest of RFI filter 250 is directly coupled with loop antenna 260.

H-bridge output driver 248 comprises four power transistors 372, 374, 376 and 378, as well as a capacitor 380 and transformer 370. These elements function identically to their counterparts in the circuit illustrated in FIG. 2, with the exception of transformer 370, which has no direct counterpart. As discussed immediately above, transformer 370 actually acts in place of the loop antenna 190 of FIG. 2.

RFI filter 250 comprises transformer 370 and ladder LC network 382 Ladder LC network 382 comprises an LC (inductor-capacitor) series combination, a capacitor, and two capacitors in series grounded at the connection, all in parallel. In addition, loop antenna 260 is connected to RFI filter 250 in parallel across ladder LC network 382 via a jack 384. Transformer 370 is connected such that one end of each matched coil is connected to one of the outputs of first output pair of power transistor 372 and 378 and second output pair of transistors 374 and 276. In addition, the remaining end of each coil is connected to a different one of the ends of ladder LC network 382.

RFI filter 250 acts to prevent the PWM signal from reaching the antenna, as described above, and is of a type well known to the art. A novel feature of the present invention is that the resonant frequency of the LC series combination can be matched to the frequency of the PWM signal, as described above. This increases the performance of RFI filter 250.

Loop antenna 260 is attached to antenna driver circuit 240 via a plug 386 which mates with jack 384. The loop antenna 260 of the preferred embodiment can be worn about the neck of the user, and is thereby in close proximity to the magnetic transducer (not shown) and yet may be made unobtrusive.

In addition, the system of FIG. 3 includes a DC power supply 220. Power supply 220 comprises a battery pack 222 connected to a switch 390. Switch 390 allows the user to deactivate the system by removing power. In the preferred embodiment shown, battery pack 222 holds two alkaline 9 volt batteries and one mercury 5.6 volt battery.

In addition, regulations of the power supply is accomplished by means of the numerous trimming capacitors between each element connected to either ground or a high voltage, and to ground. Also, regulator 224 is shown comprising an operational amplifier configured as an integrator 392, transistor 394 and the resistor-capacitor-diode network 396. Network 396 acts to provide a fairly noise-free clamped power level, which is further smoothed by integrator 392 and amplified by transistor 394.

While the examples illustrated above are preferred embodiments and examples of the hearing system of the present invention, various modifications will become apparent to those skilled in the art from the foregoing description and the accompanying drawings. Accordingly, the present invention is to be limited solely by the scope of the following claims.

What is claimed is:

1. A hearing system apparatus for electromagnetically communicating signals to a magnetic transducer, said apparatus comprising:
   signalling means for producing a pulse-width modulated current signal;
   antenna means coupled to said signalling means for producing a variable electromagnetic field whose energy intensity is proportional to the output of said signalling means;
   energy storage means coupled to said antenna means for storing a substantial portion of the energy stored in the magnetic field produced by said antenna means when the magnetic field collapses between cycles of said current signal; and
   energy recycling means coupled to said storage means and said antenna means for recovering the energy stored in said storage means for use in the next electromagnetic field cycle;
   wherein said energy recycling means comprises a Class-D amplifier electrically coupled to said energy storage means, the inputs of said amplifier being electrically coupled to said signalling means and the outputs of said amplifier being electrically coupled to said antenna means.

2. The apparatus of claim 1 further comprising current source means coupled to said antenna means for providing current sufficient to replace that energy which is stored in the electromagnetic field of said antenna means and which is not recovered and stored in said storage means.

3. The apparatus of claim 1 wherein said storage means comprises a capacitor and an inductor.

4. The apparatus of claim 3 wherein said Class-D amplifier comprises an H-Bridge driver electrically coupled to said capacitor.

5. A hearing system comprising:
   acoustic transducer means for converting acoustic energy into an input electrical signal;
   signalling means for producing a pulse-width modulated current signal representative of said input electrical signal;
   antenna means coupled to said signalling means for producing a variable electromagnetic field whose energy intensity is proportional to the output of said signalling means;
   energy storage means coupled to said antenna means for recovering a substantial portion of the energy stored in the magnetic field produced by said antenna means when the magnetic field collapses between cycles of said current signal;
   energy recycling means coupled to said storage means and said antenna means for recovering the energy stored in said storage means for use in the next electromagnetic field cycle;

current source means coupled to said antenna means for providing current sufficient to replace that energy which is stored in the electromagnetic field of said antenna means and which is not recovered and stored in said storage means; and magnetic transducer means for responding to changes in the magnetic field produced by said antenna means by producing vibrations corresponding to said input electrical signal;

wherein said energy recycling means comprises a Class-D amplifier electrically coupled to said energy storage means, the inputs of said amplifier being electrically coupled to said signalling means and the outputs of said amplifier being electrically coupled to said antenna means.

6. The system of claim 5 wherein said acoustic transducer means comprises a microphone.

7. The system of claim 5 wherein said storage means comprises a capacitor and an inductor.

8. The system of claim 7 wherein said Class-D amplifier comprises an H-Bridge driver electrically coupled to said capacitor.

* * * * *